(12) United States Patent
Adelsson et al.

(10) Patent No.: US 6,320,500 B1
(45) Date of Patent: Nov. 20, 2001

(54) INDICATING DEVICE, SPECIALLY IN A VEHICLE

(75) Inventors: Per Adelsson; Fredrik Botling, both of Göteborg; Staffan Wendeberg, Torslanda, all of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/485,256

(22) PCT Filed: Aug. 11, 1998

(86) PCT No.: PCT/SE98/01461

§ 371 Date: Apr. 26, 2000

§ 102(e) Date: Apr. 26, 2000

(87) PCT Pub. No.: WO99/08075

PCT Pub. Date: Feb. 18, 1999

(30) Foreign Application Priority Data

Aug. 11, 1997 (SE) .................................................. 9702915

(51) Int. Cl.$^7$ ...................................................... B60Q 1/00
(52) U.S. Cl. .......................... 340/441; 340/435; 340/903
(58) Field of Search .................................. 340/436, 435, 340/903, 904, 441, 936, 937, 938; 701/45, 301; 180/167, 169, 197

(56) References Cited

U.S. PATENT DOCUMENTS

| 3,694,084 | * | 9/1972 | Citron ..................................... 356/25 |
| 3,984,836 | * | 10/1976 | Oishi et al. . |
| 4,208,658 | * | 6/1980 | Jujiki et al. .............................. 342/70 |
| 4,988,994 | * | 1/1991 | Loeven ................................. 340/936 |
| 5,243,194 | | 9/1993 | Sano et al. ......................... 250/461.1 |
| 5,523,922 | | 6/1996 | Kato ....................................... 362/23 |
| 5,741,058 | * | 4/1998 | Suzuki et al. .......................... 362/27 |
| 6,014,601 | * | 1/2000 | Gustafson ............................. 701/45 |

FOREIGN PATENT DOCUMENTS

| 2148/83 | 4/1983 | (CH) . |
| 89309153.8 | 6/1989 | (EP) . |
| 9522003.4 | 10/1995 | (GB) . |
| 5-149759 | 6/1993 | (JP) . |
| 9-325051 | 12/1997 | (JP) . |

* cited by examiner

Primary Examiner—Van T Trieu
(74) Attorney, Agent, or Firm—Samuels, Gauthier & Stevens, LLP

(57) ABSTRACT

An indicating device in a vehicle that supplies complementary information to the driver of the vehicle. The device is provided with at least one scale for displaying basic information on an index disc. The index disc includes indicators arranged in close connection with and in relation to individual indexes of the scale and arranged as individually controllable light sources for indicating complementary information, which is relatable to the scale. The scale is arranged so that the basic information includes the vehicle speed and the complementary information of a relative speed to a vehicle in front.

6 Claims, 1 Drawing Sheet

INDICATING DEVICE, SPECIALLY IN A VEHICLE

TECHNICAL FIELD

The present invention refers to an indicating device, specially in a vehicle and intended for supplying complementary information to the driver of the vehicle, which device is provided with at least one scale for showing basic information or the like on an index disc.

BACKGROUND OF THE INVENTION

The vehicles of today are usually arranged with one or several computer units, which control certain functions of the vehicle to provide a safer and more comfortable driving.

There is a need to supply the driver of a vehicle with some information, preferably in real time. Presently, there are several types of displays, which by means of for example text or symbols can supply relevant information. However, these are usually complex and require the concentration of the driver to read the information. A person has usually difficulty to utilize written information quickly and since the driver at the same time must focus on the traffic, these types of displays are unsuitable, particularly for supplying fast, variable information.

It is also known to use different types of light sources, such as diodes and lights arranged on the instrument panel. Depending on the amount of the information to be supplied, the number of light sources can vary and these may be arranged slightly apart from the centrally placed indicating devices important for the driver, for example a speedometer, which requires that the driver must turn his attention away from it. The light source may also be placed best, for example through mounting it within an indicating device board. In this case, the layout of the indicating device is affected and the assembly will become more complicated, for example because of small space for making holes and mounting of the light source.

THE OBJECTS OF THE INVENTION AND MOST IMPORTANT FEATURES

The objects of the present invention are:
to simultaneously supply one or several types of information quickly and distinctly,
to supply visual information, for example additional information, without the driver losing his attention from the surrounding traffic,
to present a simple and relatively affordable indicating device, without need for exhaustive changes of the existing instruments on the instrument panel, and
to present an indicating device, which can be produced without obscure indicators.

These objects have been achieved by equipping the index disc of the indicating device with indicators placed in close connection with and in relation to individual indexes of the scale and arranged as individually controllable light sources for indicating complementary information, which is relatable to said scale, and said instrument being adapted so that the basic information consists of the vehicle speed and the complementary information of a relative speed to a vehicle in front.

SHORT DESCRIPTION OF THE DRAWINGS

Figure 1:
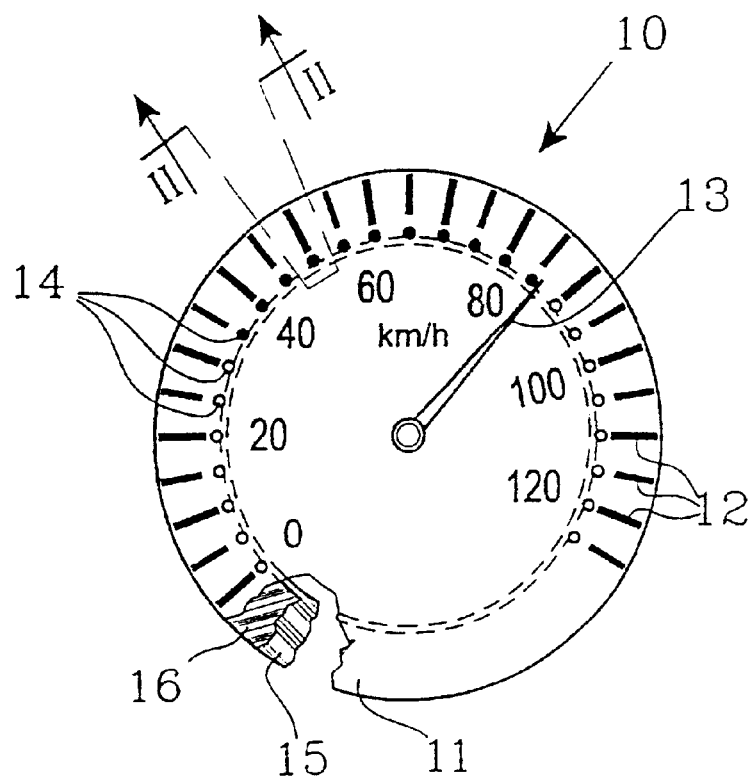
Figure 2:
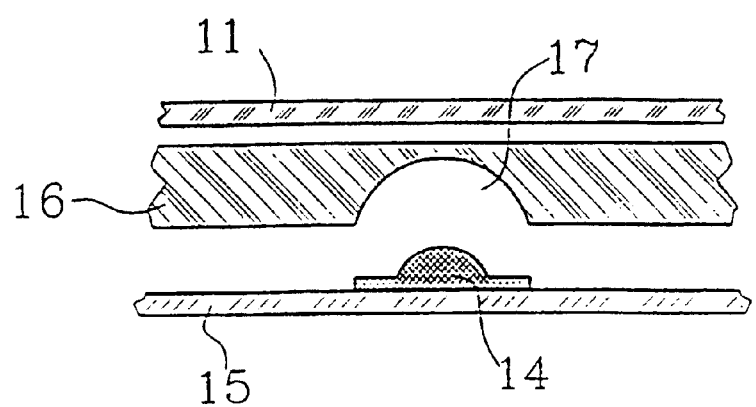

The invention will be described in more details with reference to a none-limiting embodiment illustrated on the enclosed drawings, in which:

FIG. 1 shows schematically a speedometer according to the present invention, and FIG. 2 shows schematically a cut along line II—II in FIG. 1 with dismounted details.

DESCRIPTION OF AN EMBODIMENT

FIG. 1 and 2 show an example, in which the invention is implemented in a speedometer 10. The speedometer includes an index disc 11 provided with scales or speed indexes 12. An indicator 13 is provided in a known way which displays the actual speed. The index disc may consist of a thin plastic film with partly coloured and partly luminous transmitting areas, which can from the indicators.

On or behind the index disc 11, preferably close to each index 12, an indicator is provided comprising optical emitting devices or light sources 14, for example lamps and/or light-emitting diodes. In the following, it is assumed that the light source is a light-emitting diode (LED). LEDs are connected to a driving unit (not shown) which also are connected to a control unit (not shown). The driving unit switches on or off the LEDs 14, simultaneously or individually, in accordance with signals from the control unit. Moreover, the LEDs may be arranged to illuminate with different colours or intensity depending on, for example the supply voltage.

The LEDs 14 are attached conductively, e.g. through soldering or gluing onto an essentially translucent and flexible printed circuit card 15 (PCB), which is provided with printed (etched) conductors or the like. To prevent the visibility of the LEDs and disturbance of the layout of the disc, a light-guide 16 is arranged between the LED/PCB and the backside of the disc 11. On the light guide 16, which may consist of, e.g. plexiglass, a cavity 17 is provided at least for each diode, which receive the LEDs and serve as a light concentrator, which provides better contrast. As the diode 14 is mounted invisible underneath the disc, only the illumination is visible without disturbing the layout of the disc. The PCB is translucent to prevent pools of brighter or darker points to interfere the light-guiding characteristics of the light-guides.

During the assembly, the PCB 15 and the light guide 16 are placed on each other and the entire package is arranged on the backside of the index disc 11 and fastened by means of screws, glue or the like.

According to an embodiment a cruise control system in a vehicle controls the speed with regard to a relative speed, relative to a vehicle ahead, which relative speed is displayed for the driver by means of turned on LEDs 14 corresponding to the relative speed at the same time as the indicator 13 shows the actual speed of the vehicle. FIG. 1 illustrates an embodiment of this application. The indicator 13 shows about 85 km/h at the same time a light column of LEDs (dark LEDs) from index 85 down to 35. This means that the vehicle with 50 km/h approaches another vehicle in front. Consequently, the driver appreciates this angular information much better and in an intuitive way, and it can help her/him to make better decisions in good time.

The information may also be used for other objectives, for example if the vehicle is provided with cruise control a light-emitting diode can by illuminating in another colour or intensity indicate the selected speed, or for example indicate the engine speed in the speedometer etc.

Obviously, the indicating device according to the invention does not need to be used in a vehicle, but can be used in any vessel and application, where two or more simultaneous information must be displayed. It is also possible to arrange additional rows of light sources, for example for illumination purposes.

While we have illustrated and described a preferred embodiment of the invention, it is obvious that several variations and modifications within the scope of the attached claims can occur.

What is claimed is:

1. An indicating device for use in vehicles and for supplying complementary information to a driver of the vehicle, which device is provided with at least one scale for displaying basic information on an index disc, wherein the index disc of said device includes indicators arranged in close connection with and in relation to individual indexes of the scale and arranged as individually controllable light sources for indicating complementary information, which is relatable to said scale, and that said device is so arranged that the basic information consists of vehicle speed and the complementary information of a relative speed to a vehicle in front.

2. A device according to claim 1, wherein the light source comprises a light-emitting diode (LED), which is arranged to assume at least two states, whereby each state alone or in combination with the index of the scale constitutes the supplied information.

3. A device according to claim 1, wherein at least one light source is arranged close to each index.

4. A device according to claim 2, wherein said state for the light source is on, off and/or color or intensity variation.

5. A device according to claim 1, wherein the index disc comprises a substantially thin, and at least within certain areas translucent material, for example a film, an essentially translucent carrying substrate provided with printed conductors for connection to the LEDs, and a light guide arranged between the LEDs and the index disc.

6. A device according to claim 5, wherein the light guide is provided with cavities for receiving the LEDs.

* * * * *